Oct. 22, 1968    R. E. GRANTHAM    3,407,362

SHOCK WAVE PUMPED LASER

Filed April 28, 1964

Rodney E. Grantham
INVENTOR.

BY
ATTORNEY.

AGENT.

3,407,362
SHOCK WAVE PUMPED LASER
Rodney E. Grantham, Bethesda, Md., assignor to the United States of America as represented by the Secretary of the Navy
Filed Apr. 28, 1964, Ser. No. 363,311
3 Claims. (Cl. 331—94.5)

ABSTRACT OF THE DISCLOSURE

A luminescent gas pumped laser which is shock wave pumped to excite the atoms of the gas to a state of population inversion. The light of the luminescent gas resonates in an optical cavity inducing stimulated emission in the excited gas behind a shock wave front.

---

The invention described herein may be manufactured and used by or for the Government of the United States of America for governmental purposes without the payment of any royalties thereon or therefor.

This invention relates to the art of lasers or optical masers. More particularly, it relates to a gas laser which is pumped by introducing a shock wave into the gas.

Pumping or excitation of the luminescent material to a condition of population inversion has previously been accomplished in gases either optically by means of high intensity light sources or electronically by electron collisions in a gaseous discharge established in the gas. These previous methods of pumping generally require the use of large power supplies. In the case of optical pumping, with a xenon flash lamp for example, large capacitor banks and additional electrical circuitry to charge them prior to use are required. Electrical power supplies become large for high energy systems, prohibiting their use in many applications.

It is an object of the present invention to provide a novel pumping system for a laser, which pumping system is less complex, more compact and less costly than prior pumping systems.

It is a further object of the invention to provide a laser capable of generating high energy, substantially coherent light in a relatively compact configuration.

With these objects in view, the invention comprises a gas-tight enclosure containing a luminescent gas. A shock wave generator is positioned in the enclosure and is capable of producing a shock wave in the gas which will cause the gas to luminesce. A pair of mirrors constituting a Fabry-Perot optical cavity are positioned either inside or outside the enclosure and suitable windows transparent to the operating wavelength are supplied to provide an open optical path for the output light. When the shock wave generator is actuated to produce a shock wave in the gas, the volume of gas trailing the wave will be excited and caused to luminesce. The resulting light will resonate in the optical cavity and induce stimulated emission in the excited gas to produce a pulse of intense coherent radiation.

Figure 1:
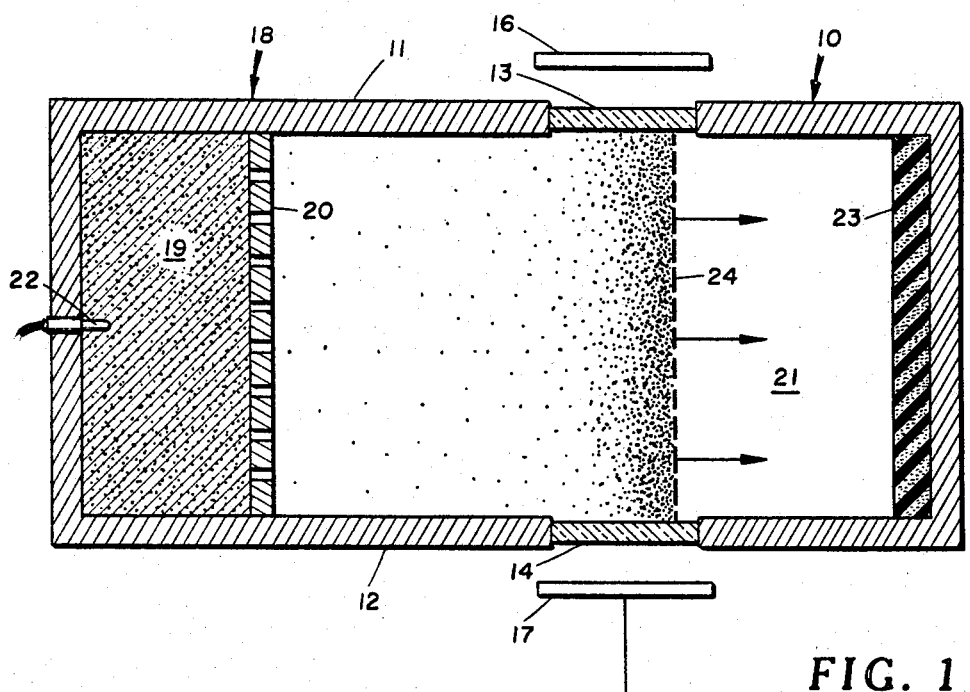
Figure 2:
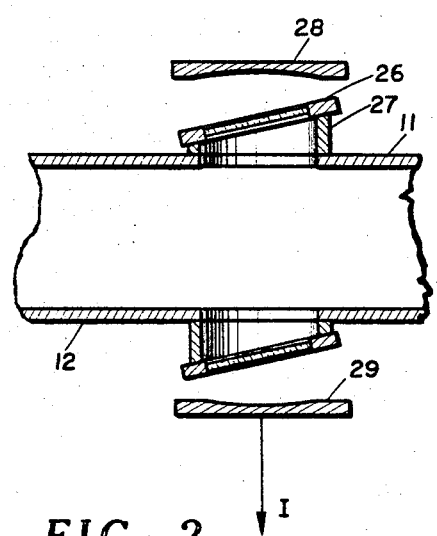

Other objects and advantages of the invention will become apparent from a consideration of the following detailed description when read in conjunction with the accompanying drawings wherein FIG. 1 is a diagrammatic showing of an optical maser in accordance with the present invention and FIG. 2 is a showing of a preferred arrangement of windows and reflectors for use in the invention.

FIG. 1 is in diagrammatic form to illustrate the principles of the present invention. As there shown, a hermetically sealed enclosure 10 having parallel sidewalls 11 and 12 serves as a container for a suitable luminescent gas or mixture of gases such as a mixture of helium and neon or a mixture of mercury and sodium vapors. Other suitable gases may be employed as desired. Windows 13 and 14, made of materials which are transparent to the operating wavelength of the laser, are provided in each of walls 11 and 12. Two mirrors, 16 and 17, comprise a Fabry-Perot resonant cavity mirror 16 being totally reflecting to the operating wavelength and mirror 17, the output mirror of the system, being slightly less than totally reflecting. It should be here understood that the mirrors of the Fabry-Perot cavity need not be outside but may be mounted inside the enclosure so long as the supports therefore are rigid enough to prevent disturbance of the required parallelism between the mirrors by the shock wave. With the mirrors inside the enclosure, only a single window in the enclosure wall is necessary.

In order to excite the atoms of the gas within the enclosure to a state of population inversion, a shock wave generator 18 is disposed at one end of the enclosure. As here shown, the shock wave generator 18 consists of a body of explosive 19 separated by means of an apertured barrier 20 from the main chamber 21 within the enclosure. A detonating cap 22 serves to ignite the explosive. The FIG. 1 showing of the shock wave generator is diagrammatic only and is intended to represent a plane wave generator, although it is not necessary that the shock wave employed in the invention have a plane wavefront. The wavefront can be any shape generated by a line approximately parallel to the axis of the Fabry-Perot system. A suitable shock wave generator would be a line-wave generator such as the one described by DuPont in its sales Bulletin No. ES-58-2A, entitled Du Pont Line-Wave Generators. Completing the assembly is a shock absorbing panel 23 secured at the end of chamber opposite the shock wave generator.

Absorption of the shock wave after one pass is not specifically required but is at present preferred. An alternative would be to provide a reflecting wall near the side boundary of the optical cavity.

When the shock wave generator is operated, a wavefront, indicated at 24 of FIG. 1, is caused to traverse chamber 21 in a direction perpendicular to the axis of the Fabry-Perot system and be absorbed in panel 23 or reflected back through the cavity by the reflecting wall abovementioned. As wavefront 24 passes through the chamber it excites the atoms of the gas to the luminescent state. The greatest density of excited atoms will exist just behind he wave front and the density of excited atoms will decrease with increasing distance from the wavefront as suggested by the dots behind wavefront 24 in FIG. 1. As wavefront 24 passes windows 13 and 14, and during the time that it is located between reflectors 16 and 17, some of the light emitted by the excited gas atoms will come to resonance in the optical cavity between the reflectors. The intensity of the light will then build up by the process of stimulated emission, resulting in an output pulse of highly intense coherent radiation. This is suggested as vector I in FIG. 1.

FIG. 2 shows a preferred arrangement of windows and reflectors for use in the present invention. This is a known configuration and is described here only in the interest of providing a complete operative disclosure. The container walls are again indicated at 11 and 12 in this figure. Since it is preferred to have the reflectors of the Fabry-Perot cavity outside the chambers so as to minimize problems of mounting, it is necessary to have windows in the cavity; and, in order to minimize unwanted reflections from the window surfaces which would result in losses and undesired modes of oscillation, the windows are mounted on the walls 11 and 12 at the Brewster angle for the operating wavelength. Structurally, each window is held by a ring 26, supported by a cylindrical tube 27 which is connected in turn to the respective walls 11 and 12. The reflectors constituting the optical resonant cavity in this embodiment are shown as of the confocal type. It should be understood that they may be plane-parallel as well. Moreover, the mirrors need not be metallic reflectors but may be multiple layer dielectric surfaces, corner reflectors, right angle prisms or any other suitable reflecting system.

The laser as here described requires no large power supply. Moreover, the system is much more compact than electrically or optically pumped lasers.

Obviously many modifications and variations of the present invention are possible in the light of the above teachings. It is therefore to be understood that within the scope of the appended claims the invention may be practiced otherwise than as specifically described.

What is claimed is:
1. A gas laser comprising
   a sealed enclosure,
   a luminescent gas capable of supporting a population inversion condition filling said enclosure,
   a pair of mirrors defining an optical axis and a resonant cavity located at least in part in said enclosure,
   at least one window for transmitting radiation out of said enclosure, and
   a shock wave generator for setting up a shock wave having a direction substantially perpendicular to said axis in said gas to produce said condition of population inversion therein by direct action thereon.
2. A gas laser comprising
   a container of luminescent gas capable of supporting a population inversion, said container having a pair of oppositely disposed optical windows therein,
   a pair of mirrors disposed outside said windows and defining an optical axis and a resonant cavity located at least in part in said container,
   and means for establishing a population inversion of the atoms of said gas, said means consisting of a shock wave generator for setting up a shock wave having a direction substantially perpendicular to said axis in said gas to produce said population inversion by direct action thereon.
3. A gas laser comprising
   a hermetically sealed enclosure having a pair of parallel walls,
   a luminescent gas capable of supporting a population inversion contained in said enclosure,
   an optical window in each of said parallel walls, said windows being disposed opposite each other,
   a pair of reflectors, each disposed adjacent one of said windows and defining a resonant optical cavity located in part in said enclosure, and
   means for generating a shock wave in said gas propagated in a direction perpendicular to the normal to said reflectors,
   whereby upon passage of said shock wave through said enclosure, said gas being excited to luminesce by direct action thereon, the resultant light resonating in said optical cavity and inducing stimulated emission in said excited gas to produce a pulse of intense coherent radiation.

References Cited

UNITED STATES PATENTS 3,300,734   1/1967   De Ment _____ 331—94.5

FOREIGN PATENTS 1,187,734   2/1965   Germany.

OTHER REFERENCES

Crosby: Nondestructive Laser Pumping by High Explosives, July 15, 1963, Applied Optics, December 1963, vol. 2, #12, pp. 1339–1340.

JEWELL H. PEDERSEN, *Primary Examiner.*

B. J. LACOMIS, *Assistant Examiner.*